United States Patent
Luo et al.

(10) Patent No.: US 11,934,851 B2
(45) Date of Patent: *Mar. 19, 2024

(54) TRANSFERRING DATA USING A MEDIA CHANNEL SELECTED BASED ON CONDITION TESTING

(71) Applicant: Zoom Video Communications, Inc., San Jose, CA (US)

(72) Inventors: Xingzhi Luo, Sunnyvale, CA (US); Xiaofei Wang, Hangzhou (CN); Haibing Xu, Milpitas, CA (US); Daoquan Ye, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,736

(22) Filed: May 3, 2023

(65) Prior Publication Data

US 2023/0273803 A1 Aug. 31, 2023

Related U.S. Application Data

(63) Continuation of application No. 17/191,682, filed on Mar. 3, 2021, now Pat. No. 11,675,610.

(30) Foreign Application Priority Data

Jan. 29, 2021 (CN) .......................... 202110130171.6

(51) Int. Cl.
*G06F 9/451* (2018.01)
*G06F 9/455* (2018.01)
*G06F 11/36* (2006.01)
*H04L 65/80* (2022.01)
*H04L 67/08* (2022.01)

(52) U.S. Cl.
CPC .......... *G06F 9/452* (2018.02); *G06F 9/45558* (2013.01); *G06F 11/3672* (2013.01);
(Continued)

(58) Field of Classification Search
None
See application file for complete search history.

(56) References Cited

U.S. PATENT DOCUMENTS

2003/0123436 A1 7/2003 Joseph et al.
2007/0291655 A1 12/2007 Moore et al.
(Continued)

OTHER PUBLICATIONS https://support.citrix.com/article/CTX116890, Citrix ICA Virtual Channels Overview, 7 pages, Created Aug. 15, 2014, Modified Jul. 22, 2019.
(Continued)

*Primary Examiner* — Scott B Christensen
(74) *Attorney, Agent, or Firm* — Young Basile Hanlon & MacFarlane, P.C.

(57) ABSTRACT

Calls run through a virtual desktop infrastructure server are enhanced by testing communication network conditions and selecting, based on the test results, a media channel from a set of supported media channels, including a media channel that is routed through the virtual desktop infrastructure server and encapsulated in a protocol for exchanging data for virtual desktop applications and a more direct media channel that uses a network socket pair between a media server and a personal computing device and bypasses the virtual desktop infrastructure server. In some implementations, call data of multiple types and/or from multiple sources are merged into a single virtual channel of the protocol for exchanging data for virtual desktop applications.

20 Claims, 9 Drawing Sheets

(52) U.S. Cl.
CPC .............. *H04L 65/80* (2013.01); *H04L 67/08* (2013.01); *G06F 2009/45579* (2013.01); *G06F 2009/45591* (2013.01)

(56) References Cited

U.S. PATENT DOCUMENTS

| | | | |
|---|---|---|---|
| 2011/0096673 | A1 | 4/2011 | Stevenson et al. |
| 2013/0064105 | A1 | 3/2013 | Huang et al. |
| 2017/0171048 | A1 | 6/2017 | Christmann et al. |
| 2018/0309658 | A1 | 10/2018 | Parla et al. |
| 2019/0356701 | A1 | 11/2019 | Prabhu et al. |
| 2020/0336416 | A1 | 10/2020 | Mudric et al. |
| 2020/0336484 | A1 | 10/2020 | Mahajan et al. |
| 2022/0103597 | A1 | 3/2022 | Gobena et al. |

OTHER PUBLICATIONS axendatacentre.com/blog/2020/04/22/zoom-hdx-offloading-for-citrix-virtual-desktops-part-1/, Leading Hybrid Workplace Transformation & Employee Experiences with Co-Innovation, Co-Collaboration, EI & Empathy, Zoom A/V Offloading for Citrix Virtual Desktops Part 1, 4 pages, Apr. 22, 2020.
https://www.3cx.com/community/threads/terminal-server-rds-citrix-media-offload-for-windows-app.72355/, Terminal Server (RDS)/Citrix Media Offload for Windows App? MattBSyd, 4 pages, Apr. 9, 2020.
https://en.wikipedia.org/wiki/Independent_Computing_Architecture, Independent Computing Architecture, Wikipedia, 2 pages, Nov. 10, 2019.
Citrix Product Documentation, Optimization for Microsoft Teams, 20 pages, Dec. 16, 2020.
https://docs.microsoft.com/en-us/azure/virtual-desktop/teams-on-wvd, Use Microsoft Teams on Windows Virtual desktop, 7 pages, Nov. 10, 2020.
https://support.citrix.com/article/CTX133024, Delivering Softphones with Virtual Apps and Desktops, 12 pages, created Feb. 6, 2014, modified May 19, 2020.
https://docs.vmware.com/en/VMware-Horizon/2006/horizon-remote-desktop-features/GUID-F68FA7BB-B08F-4EFF-9BB1-1F9FC71F8214.html, Configuring Media Optimization for Microsoft Teams, Jul. 23, 2020.
https://blog.zoom.us/zoom-optimizes-meetings-for-vdi/, Zoom Optimizes Meetings for VDI, David Flores, 4 pages, Apr. 17, 2020.

TRANSFERRING DATA USING A MEDIA CHANNEL SELECTED BASED ON CONDITION TESTING

CROSS-REFERENCE TO RELATED APPLICATION(S)

This application is a continuation of U.S. application Ser. No. 17/191,682, filed Mar. 3, 2021, which claims priority to Chinese Patent Application No. 202110130171.6, filed Jan. 29, 2021, the entire disclosures of which are herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for call enhancements in virtual desktop infrastructure.

One aspect of this disclosure is a method including testing communications network conditions for a network socket pair connection between a personal computing device and a media server that bypasses a virtual desktop infrastructure server to obtain direct connection test results; based on the direct connection test results, selecting a media channel from among a set of media channels for a call initiated using the virtual desktop infrastructure server, wherein the set of media channels includes a first media channel using the network socket pair connection between the personal computing device and the media server and a second media channel that is routed through the virtual desktop infrastructure server and encapsulated in a protocol for exchanging data for virtual desktop applications; and transferring media data between the media server and the personal computing device using the selected media channel to enable the call.

One aspect of this disclosure is a personal computing device, including a network interface, a processor, and a memory, wherein the memory stores instructions executable by the processor to: test communications network conditions for a network socket pair connection between a personal computing device and a media server that bypasses a virtual desktop infrastructure server to obtain direct connection test results; based on the direct connection test results, select a media channel from among a set of media channels for a call initiated using the virtual desktop infrastructure server, wherein the set of media channels includes a first media channel using the network socket pair connection between the personal computing device and the media server and a second media channel that is routed through the virtual desktop infrastructure server and encapsulated in a protocol for exchanging data for virtual desktop applications; and transfer media data between the media server and the personal computing device using the selected media channel to enable the call.

One aspect of this disclosure is a non-transitory computer-readable storage medium, comprising executable instructions that, when executed by a processor, facilitate performance of operations, including testing communications network conditions for a network socket pair connection between a personal computing device and a media server that bypasses a virtual desktop infrastructure server to obtain direct connection test results; based on the direct connection test results, selecting a media channel from among a set of media channels for a call initiated using the virtual desktop infrastructure server, wherein the set of media channels includes a first media channel using the network socket pair connection between the personal computing device and the media server and a second media channel that is routed through the virtual desktop infrastructure server and encapsulated in a protocol for exchanging data for virtual desktop applications; and transferring media data between the media server and the personal computing device using the selected media channel to enable the call.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
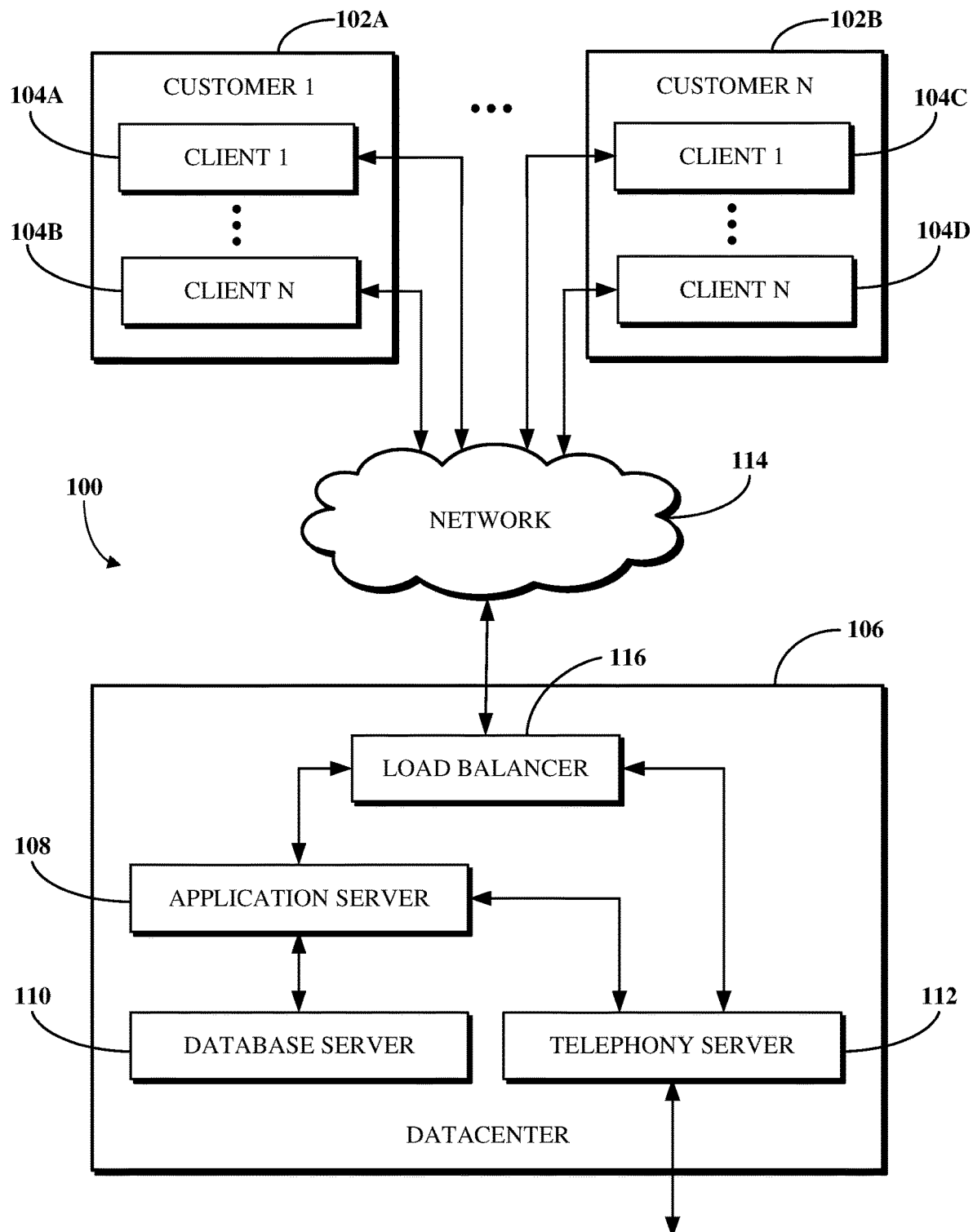
FIG. 1 is a block diagram of an example of an electronic computing and communications system.

A service often offered to large groups of users remotely is virtual desktop infrastructure (VDI), which allows user access a desktop interface that is provided by a server. This desktop interface provides access to applications that run on the operating system used by the virtual desktop instance, which may be a different operating system than that used by a personal computing device that a user uses to remotely access the virtual desktop.

Client software for a UCaaS platform can be run on a virtual desktop instance. For example, UCaaS client software running on a VDI server can be used to facilitate the participation of a user in calls (e.g., video conferencing calls or voice-only calls) from their personal computing device that is connected to the VDI server. The VDI server may relay some or all data used to facilitate the call between one or more servers of a UCaaS platform and the user's personal computing device. It is advantageous in some circumstances to route media data (e.g., audio and/or video data) for a call more directly between a media server of the UCaaS platform and the personal computing device to bypass the VDI server. This practice is often referred to as media offloading. In appropriate circumstances, media offloading can conserve computing resources on the VDI server, conserve network bandwidth that would other wise be used to relay the media data for the call, which can be a relatively high data rate, and reduce latency in the call, which can a significant factor in perceived call quality. This comes at the expense of an increase in the use of processing resources on the personal computing device, which has to run media coders and decoders for the media streams locally. However, in some circumstances, media offloading can degrade call quality.

Implementations of this disclosure address problems such as these by enabling a personal computing device that is entering a call setup by client software running in a VDI server to test the communication network conditions and select a media channel for transferring media data of the call from a set of supported media channels to suit the current conditions. For example, the set of supported media channels may include (1) a relatively direct connection to the media server that VDI server bypasses and uses a network socket pair connection (e.g., using a User Datagram Protocol (UDP) socket pair) between the media server and the personal computing device; (2) a second media channel that is routed through the VDI server and encapsulated in a protocol (e.g., the Independent Computing Architecture (ICA) protocol or the Remote Desktop Protocol (RDP) protocol) for exchanging data for virtual desktop applications; and/or (3) a third media channel using a network socket pair connection (e.g., using a UDP socket pair) between the personal computing device and the VDI server. In some implementations, the more direct connection using the first media channel is preferred and may be used whenever test results for this direct connection satisfy a criterion (e.g., sufficient data throughput and/or low enough latency. In some implementations, the third media channel is preferred to the second media channel, and the second media channel is selected when the first media channel is disqualified, and the third media channel satisfies a criterion. If both the first media channel and the third media channel are disqualified than the second media channel may be selected. In some implementations, test results for multiple supported media channels may be compared to each other and a media channel may be selected based on the comparison.

When the second media channel that that is routed through the VDI server and encapsulated in a protocol (e.g., the ICA protocol or the RDP protocol) for exchanging data for virtual desktop applications is used, it can be advantageous to conserve the number of virtual channels of the protocol that are used by a given call. For example, multiple media streams (e.g., from different call participants, may be merged into a single virtual channel of the protocol. In some implementations, all of the data exchanged during the call (e.g., including control data, audio data, video data, and share data) may be merged into a single virtual channel of the protocol. Conserving virtual channel usage may enable a VDI system to support a high volume of calls, making the system more scalable. Merging different types of call data into a single virtual channel of the protocol may also enable custom prioritization the various traffic types by a phone agent or a meeting agent.

To describe some implementations in greater detail, reference is first made to examples of hardware and software structures used to implement call enhancements in virtual desktop infrastructure. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
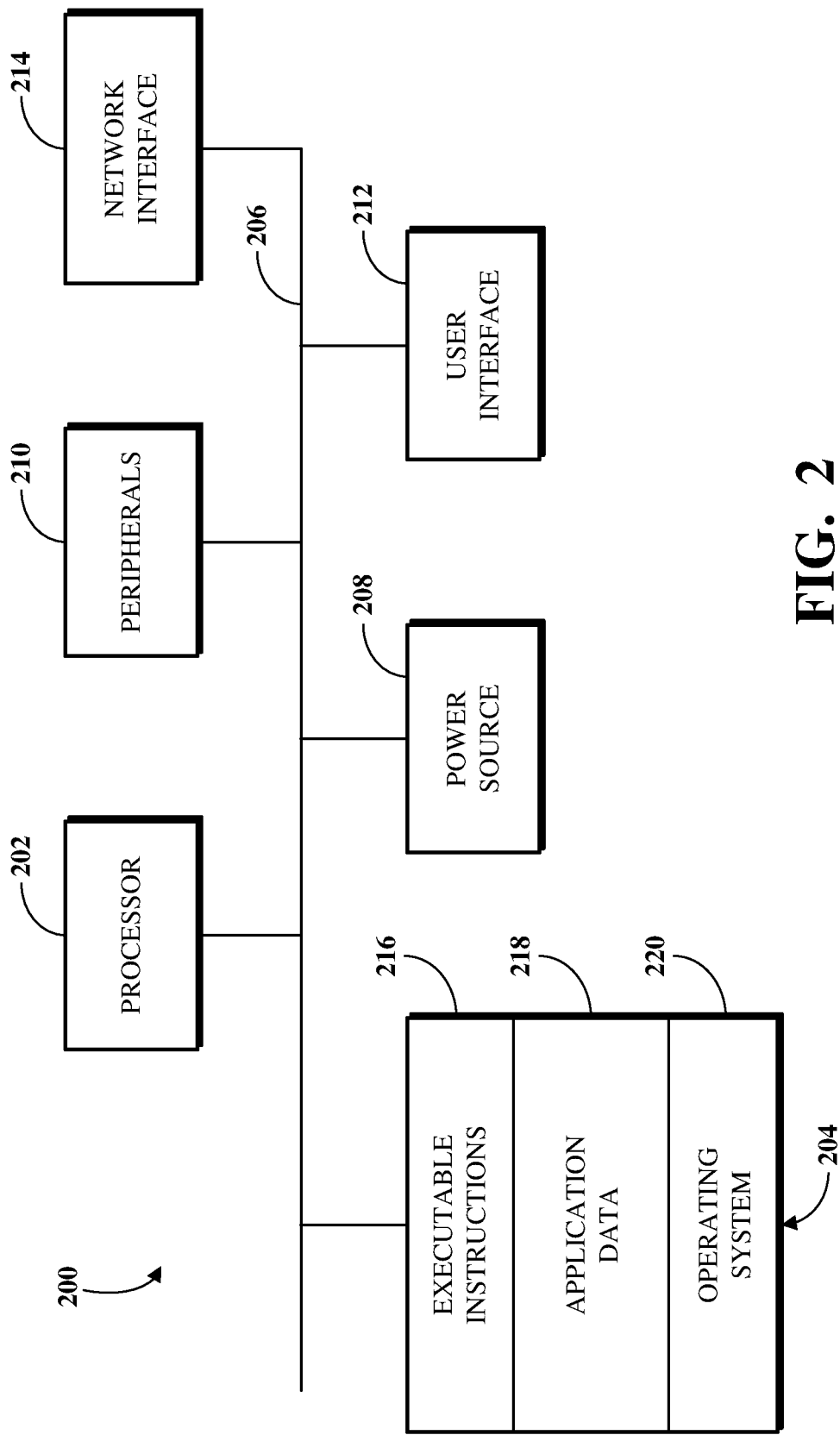
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
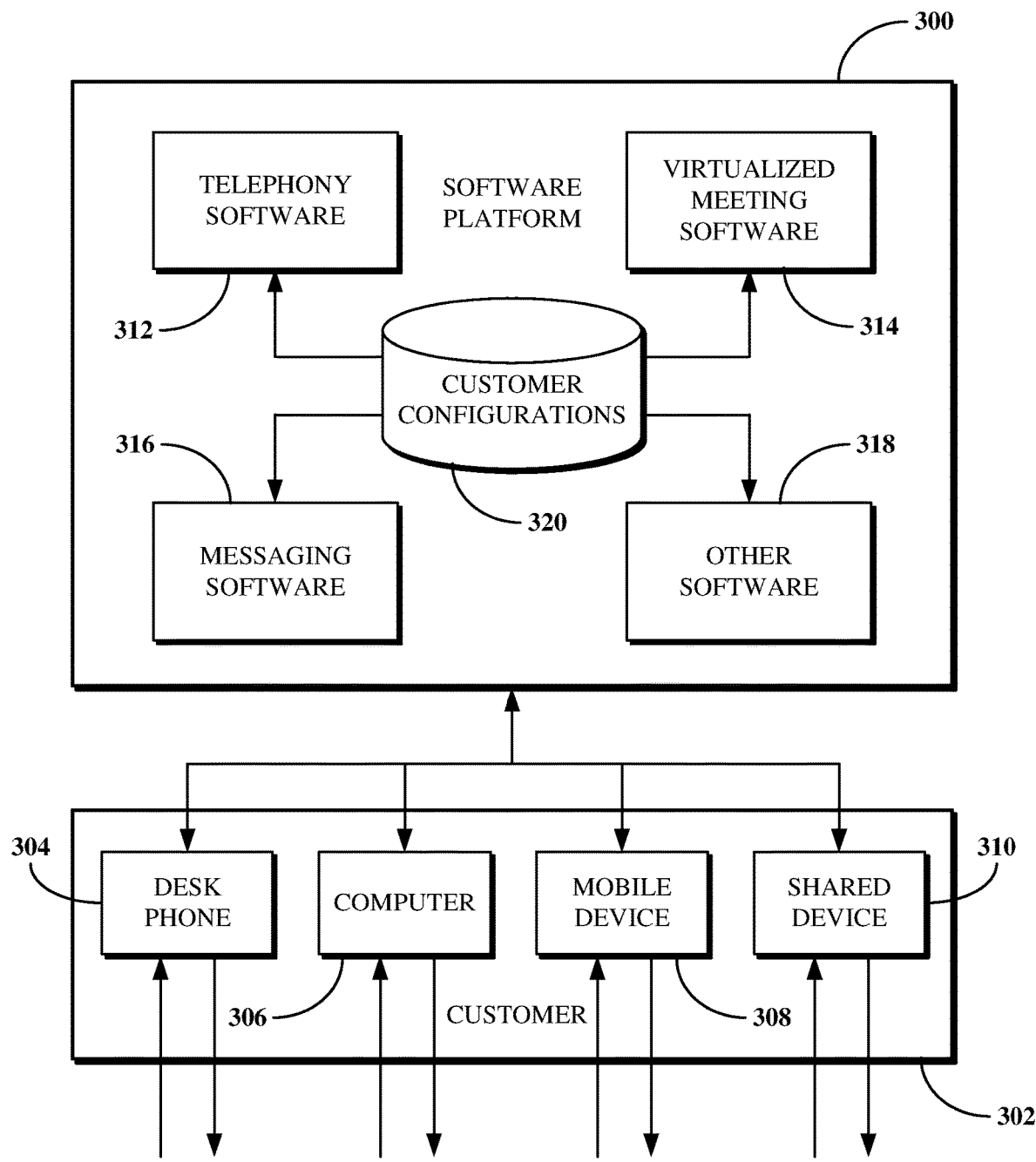
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices.

The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include code for selecting a media channel from a set of options for a call made using virtual desktop infrastructure in order to enhance the call.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4:
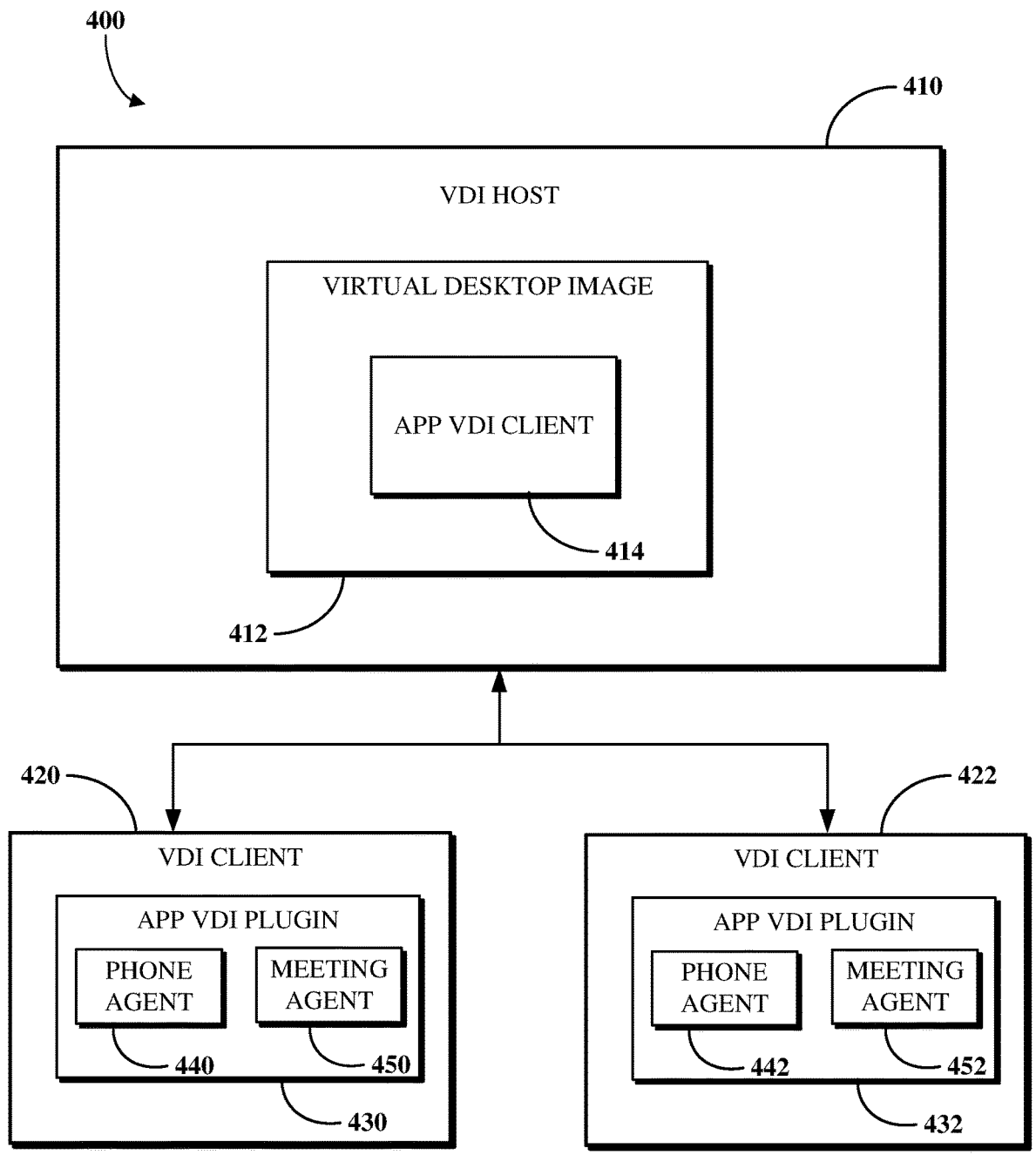
FIG. 4 is a block diagram of an example of a virtual desktop infrastructure system configured to enable calls using a virtual desktop instance.

FIG. 4 is a block diagram of an example of a virtual desktop infrastructure system 400 configured to enable calls using a virtual desktop instance. The virtual desktop infrastructure system 400 includes a virtual desktop infrastructure host 410; a virtual desktop infrastructure client 420 (e.g., a VDI thin client); and a virtual desktop infrastructure client 422. A virtual desktop image 412, which includes an application virtual desktop infrastructure client 414, is provided by the virtual desktop infrastructure host 410. The virtual desktop infrastructure client 420 includes an application virtual desktop infrastructure plugin 430, which includes a phone agent 440 and a meeting agent 450. The virtual desktop infrastructure client 422 includes an application virtual desktop infrastructure plugin 432, which includes a phone agent 442 and a meeting agent 452. Note that in practice the virtual desktop infrastructure host 410 may support many more virtual desktop infrastructure clients than the two depicted in FIG. 4. For example, the virtual desktop infrastructure system 400 may be used to implement the technique 600 of FIG. 6. For example, the technique 600 of FIG. 6 may implanted by the virtual desktop infrastructure client 420 or the virtual desktop infrastructure client 422.

Calls may be supported in the virtual desktop infrastructure system 400 by the cooperation of the application virtual desktop infrastructure client 414 with a virtual desktop infrastructure plugin (430 or 432). For example, a call may include streaming of audio from two or more participants, including a user of the virtual desktop infrastructure client 420 being used to place or answer the call using the phone agent 440. For example, a call may include streaming of audio and video from two or more participants, including a user of the virtual desktop infrastructure client 420 being used to host or attend the call using the meeting agent 450, which may facilitate video calls/conferencing.

The application virtual desktop infrastructure client 414 is installed in the virtual desktop image 412 that is instantiated on the virtual desktop infrastructure host 410. The virtual desktop infrastructure plugin 430 is installed in virtual desktop infrastructure client 420. For example, the virtual desktop infrastructure client 420 run on a personal computing device (e.g., a laptop, smartphone, or a tablet). The virtual desktop infrastructure client 420 may run on a different operating system (e.g., Windows, OS X, Linux, or Android) than the virtual desktop image 412 and it may run on a different operating system than other virtual desktop infrastructure clients. For example, here the virtual desktop infrastructure client 420 may run on Windows and the virtual desktop infrastructure client 422 runs on Linux. As a result, the virtual desktop infrastructure plugin 430, the phone agent 440, and the meeting agent 450 are Windows versions of these software; while the virtual desktop infrastructure plugin 432, the phone agent 442, and the meeting agent 452 are a Linux version of these software. In some implementations, phone agents 440 and 442 are just different instances of the same software components. In some implementations, meeting agents 450 and 452 are just different instances of the same software components. The virtual desktop infrastructure system 400 may enable a wide variety of devices to access the call functionality provided by the application virtual desktop infrastructure client 414.

Figure 5:
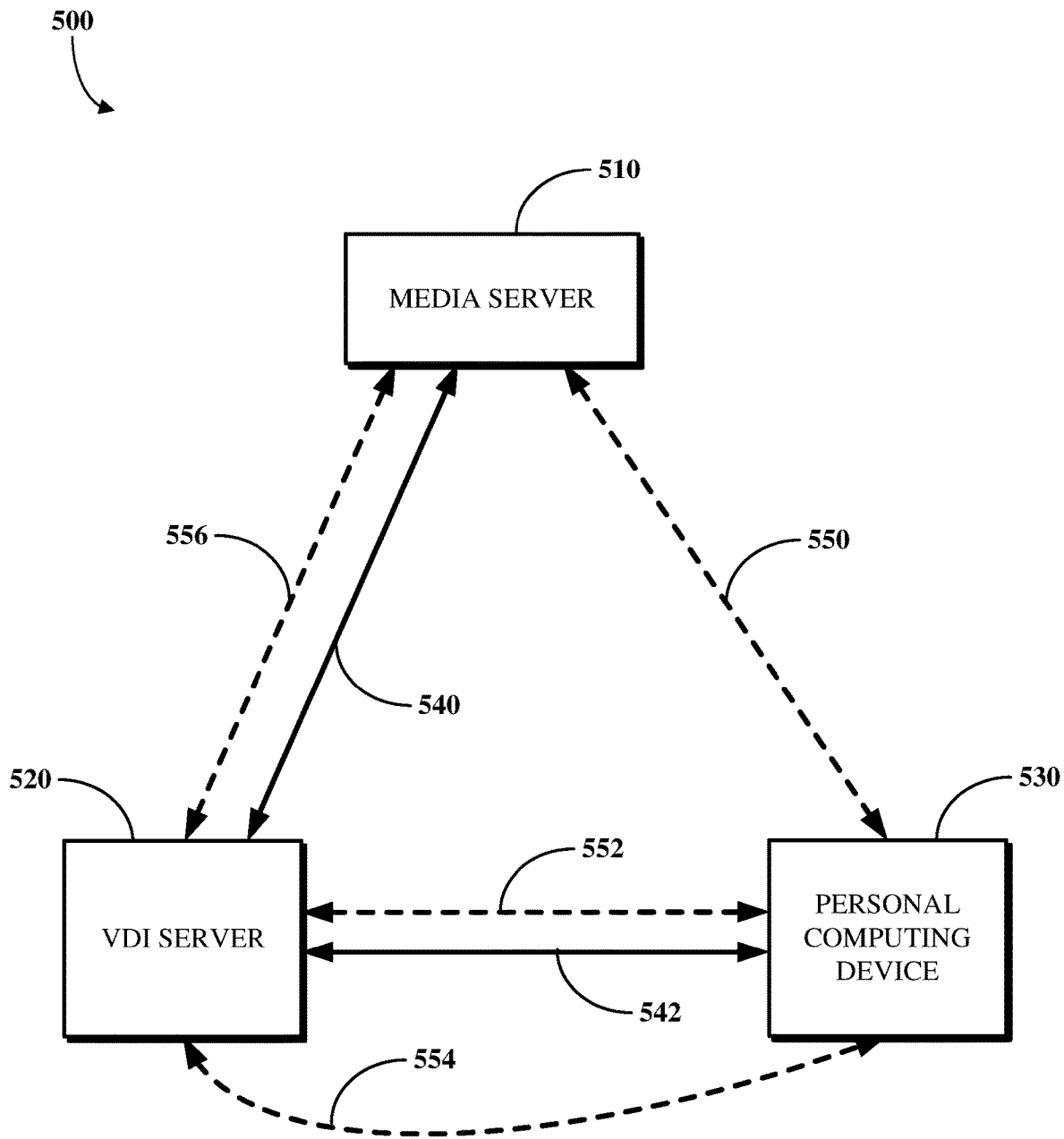
FIG. 5 is a block diagram of an example of a system configured to enable calls using a virtual desktop instance that illustrates the flow of media data to support a call.

FIG. 5 is a block diagram of an example of a system 500 configured to enable calls using a virtual desktop instance that illustrates the flow of media data to support a call. The system 500 includes a media server 510; a virtual desktop infrastructure server 520; and a personal computing device 530. For example, the system 500 may be used to implement the technique 600 of FIG. 6. For example, the technique 600 of FIG. 6 may implemented by the personal computing device 530.

For example, the media server 510 may be the telephone server 112. In some implementations, the media server 510 is a public branch exchange server. In some implementations, the media server 510 is a multimedia router (MMR) server.

For example, the virtual desktop infrastructure server 520 may run the virtual desktop infrastructure host 410, including one or more virtual desktop images that have the application virtual desktop infrastructure client 414 installed. For example, the virtual desktop infrastructure server 520 may include a computing device, such as the computing device 200 of FIG. 2.

For example, the personal computing device 530 may be a laptop, a smartphone, a tablet. For example, the personal computing device 530 may be one of the clients 304 through 310. For example, the personal computing device 530 may run a virtual desktop infrastructure client (e.g., the virtual desktop infrastructure client 420) the includes an application virtual desktop infrastructure plugin with a phone agent and/or a meeting agent for participating in calls. In some implementations, a virtual desktop infrastructure client (e.g., a VDI thin client) running on the personal computing device 530 acts as a slave and a virtual desktop infrastructure host running on the virtual desktop infrastructure server 520 acts as a master in a master/slave interaction to facilitate a call. For example, the personal computing device 530 may include a computing device, such as the computing device 200 of FIG. 2.

For example, a call may be initiated by the virtual desktop infrastructure server 520 in response to request from the personal computing device 530 (e.g., caused by input from a user such as dialing) or in response to an inbound call message from the media server 510 or an associated server that supports calls using the media server 510. As part of the setup for the call, commands or other control data may be exchanged between the media sever 510 and the virtual desktop infrastructure server 520 via a control channel 540 through a communications network. For example, the control channel 540 may utilize a cryptographic protocol such as Transport Layer Security (TLS) 1.2 or Secure Sockets Layer (SSL). The virtual desktop infrastructure server 520 may be configured to relay some or all of the control data received, including call parameters, to the personal computing device 530 via a control channel 542. For example, the control channel 542 may be encapsulated in a protocol (e.g., the ICA protocol or the RDP protocol) for exchanging data for virtual desktop applications. In particular, the virtual desktop infrastructure server 520 may pass an identifier for the media server 510 to personal computing device 530 to facilitate the establishment of a more direct connection between the media server 510 and personal computing device 530 that bypasses the virtual desktop infrastructure server 520 to enable media offloading.

Figure 6:
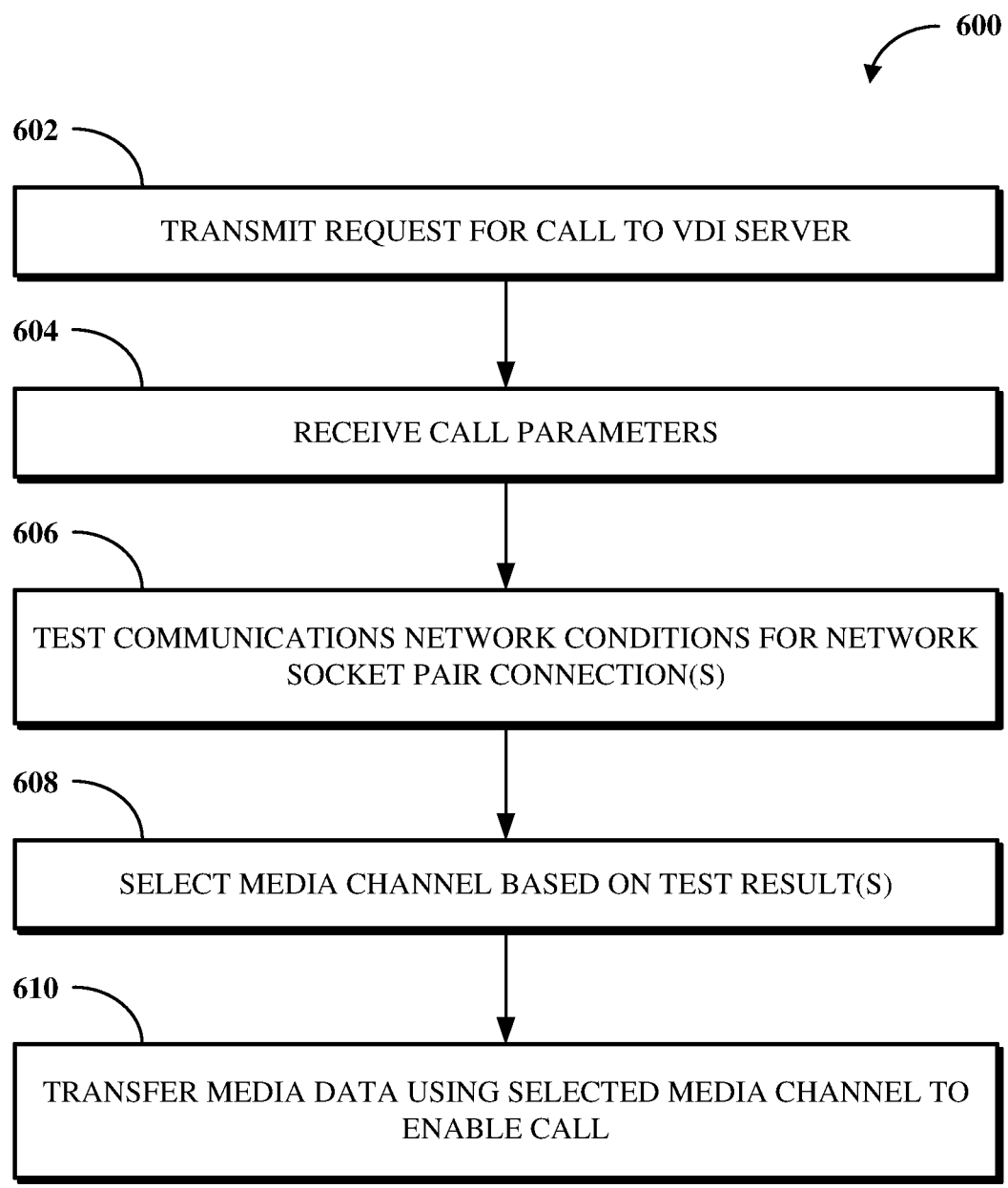
FIG. 6 is a flowchart of an example of a technique for selecting a media channel to support a call initiated using a virtual desktop infrastructure server.

The personal computing device 530 may be configured to implement the technique 600 of FIG. 6 to test the communications network conditions and select a media channel for bearing media data for the call from a set of supported media channels. The set of supported media channels may include a first media channel 550 using a network socket pair connection between the personal computing device 530 and the media server 510. The set of supported media channels may include a second media channel 552 that is routed through the virtual desktop infrastructure server 520 and encapsulated in a protocol (e.g., ICA or RDP) for exchanging data for virtual desktop applications. The set of supported media channels may include a third media channel 554 using a second network socket pair connection between the personal computing device 530 and the virtual desktop infrastructure server 520. If an indirect connection that routes media data through the virtual desktop infrastructure server 520 is used, then a media channel 556 between the virtual desktop infrastructure server 520 and the media server 510 will also be established. For example, the media channels 550, 554, and/or 556 may utilize a network socket pair for their respective endpoints according to a transport protocol, such as, for example, UDP or Secure Real-time Transport Protocol (SRTP). In some implementations, a media channel (e.g., 550 or 554) may use a customized port range (e.g., UDP ports 9,000-10,000). Once a media channel has been selected for the call, the selected media channel (e.g., the media channel 550, the media channel 552, or the media channel 554) may be used to transfer between the media server 510 and the personal computing device 530 to enable the call. Selecting a media channel for the call dynamically based on tests of communications network conditions may enhance calls in virtual desktop infrastructure system by improve resource utilization while maintaining call quality.

Figure 7:
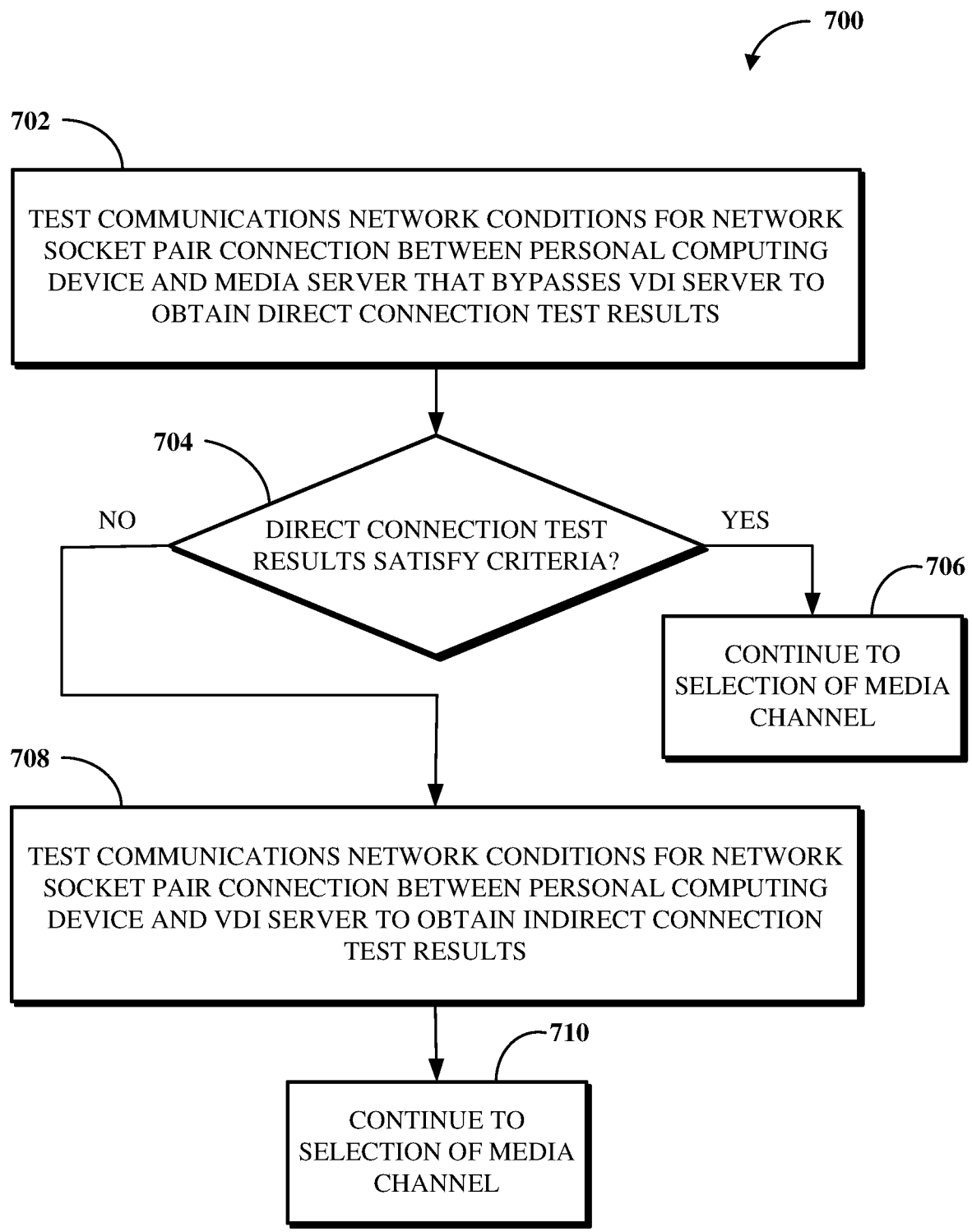
FIG. 7 is a flowchart of an example of a technique for testing communications network conditions for network socket pair connections in system configured to enable calls using a virtual desktop instance.
Figure 8:
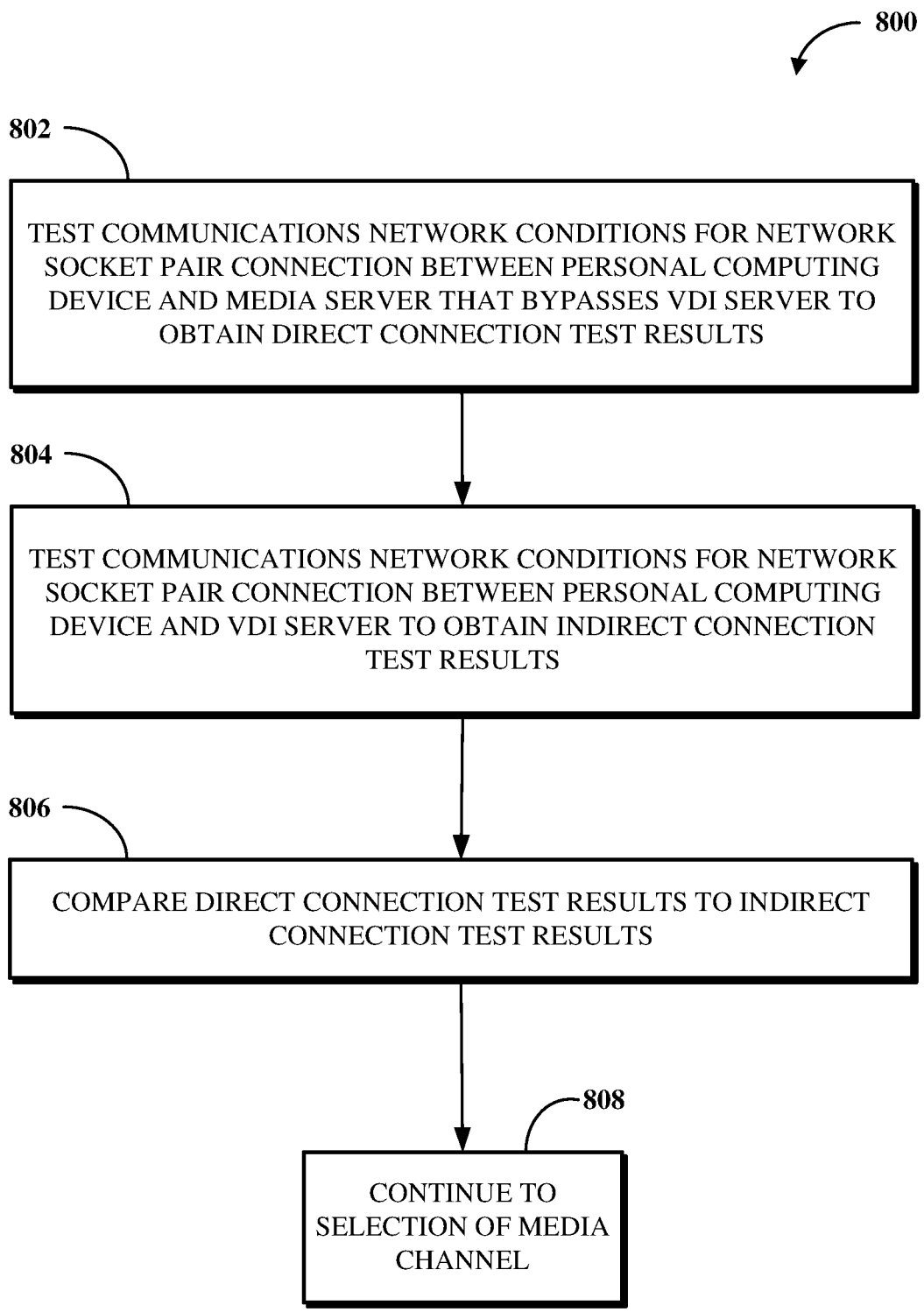
FIG. 8 is a flowchart of an example of a technique for testing communications network conditions for network socket pair connections in system configured to enable calls using a virtual desktop instance.
Figure 9:
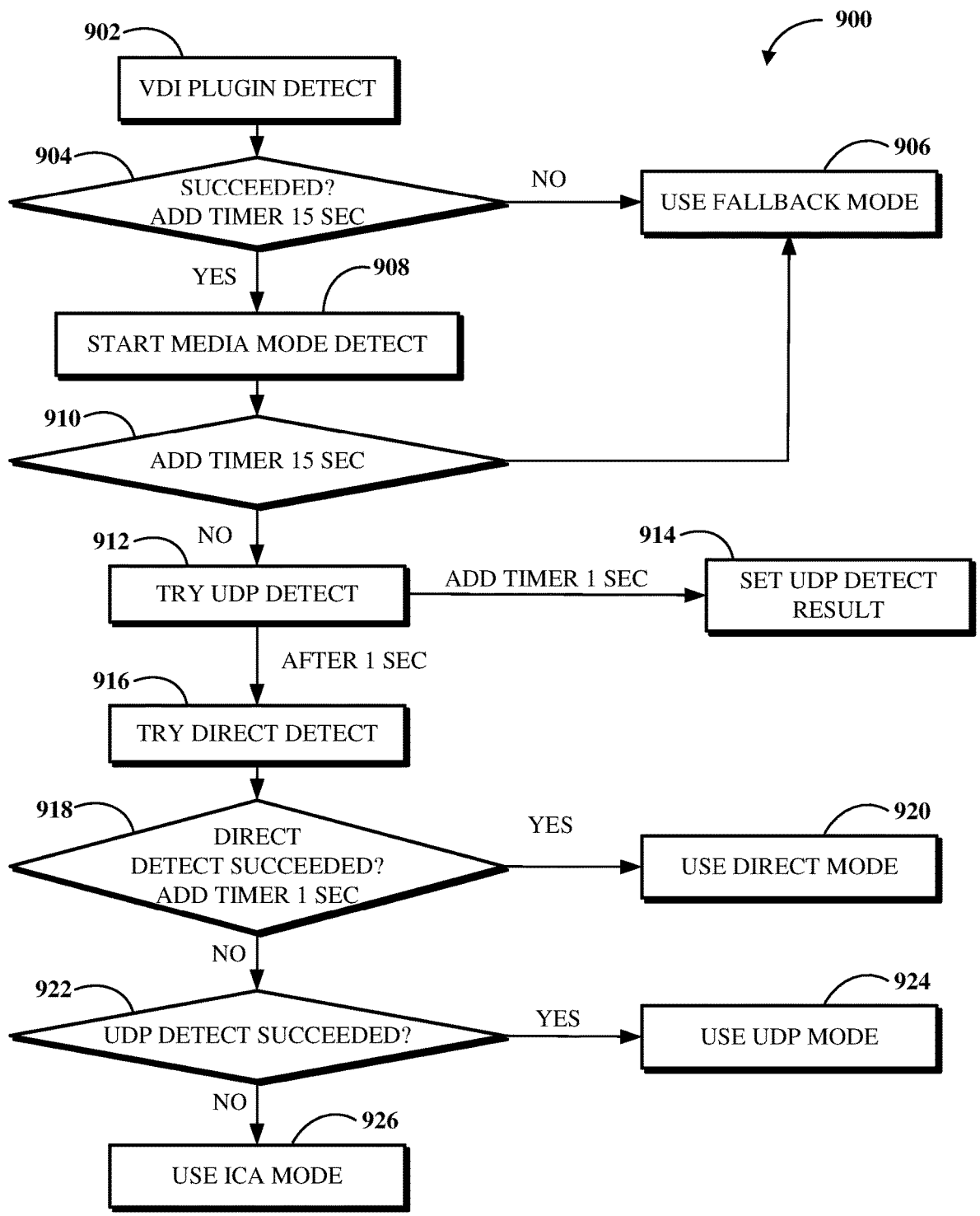
FIG. 9 is a flowchart of an example of a technique for selecting a media channel to support a call initiated using a virtual desktop infrastructure server.

To further describe implementations in greater detail, reference is next made to examples of techniques which may be performed to provide call enhancements in virtual desktop infrastructure. FIG. 6 is a flowchart of an example of a technique 600 for selecting a media channel to support a call initiated using a virtual desktop infrastructure server. FIG. 7 is a flowchart of an example of a technique 700 for testing communications network conditions for network socket pair connections in system configured to enable calls using a virtual desktop instance. FIG. 8 is a flowchart of an example of a technique 800 for testing communications network conditions for network socket pair connections in system configured to enable calls using a virtual desktop instance. FIG. 9 is a flowchart of an example of a technique 900 for selecting a media channel to support a call initiated using a virtual desktop infrastructure server.

The techniques 600, 700, 800, and/or 900 can be executed using computing devices, such as the systems, hardware, and software described with respect to FIGS. 1-5. The techniques 600, 700, 800, and/or 900 can be performed, for example, by executing a machine-readable program or other computer-executable instructions, such as routines, instructions, programs, or other code. The steps, or operations, of the techniques 600, 700, 800, and/or 900 or another technique, method, process, or algorithm described in connection with the implementations disclosed herein can be implemented directly in hardware, firmware, software executed by hardware, circuitry, or a combination thereof.

For simplicity of explanation, each of the techniques 600, 700, 800, and 900 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring to FIG. 6, the technique 600 for selecting a media channel to support a call initiated using a virtual desktop infrastructure server is shown. At 602, the technique 600 includes transmitting, using a personal computing device (e.g., the personal computing device 530), a request for a call to a virtual desktop infrastructure server (e.g., the virtual desktop infrastructure server 520). For example, the request may be sent using application software (e.g., the phone agent 440 or the meeting agent 450) running over application virtual desktop infrastructure plugin (e.g., the application VDI plugin 430) that runs on the personal computing device. The request may be received by an application virtual desktop infrastructure client (e.g., the application VDI client 414) running in a virtual desktop instance running on the virtual desktop infrastructure server. For example, the request may be encapsulated in a protocol (e.g., the ICA protocol or the RDP protocol) for exchanging data for virtual desktop applications. The virtual desktop infrastructure server may in turn, responsive to the request, initiate a call via control communications with a media server (e.g., the media server 510). For example, the media server may be a public branch exchange server. For example, the media server may be a public branch exchange server. For example, the media server may be a multimedia router server. For example, the request may be transmitted using a network interface (e.g., the network interface 214) of the personal computing device.

At 604, the technique 600 includes receiving, using the personal computing device, call parameters from the virtual desktop infrastructure server, wherein the call parameters include an identifier for the media server. For example, the identifier for the media server may include an Internet Protocol (IP) address for the media server. For example, the identifier for the media server may include an IP address for the media server. For example, the identifier for the media server may include an internet domain name used by the media server. The call parameters may include other data that may be used to facilitate the setup and maintenance of the call, such a port number to be used transferring data of the call. For example, the call parameters may be relayed an application virtual desktop infrastructure client (e.g., the application VDI client 414) running in a virtual desktop instance running on the virtual desktop infrastructure server.

For example, the call parameters may be encapsulated in a protocol (e.g., the ICA protocol or the RDP protocol) for exchanging data for virtual desktop applications. For example, the call parameters may be received using a network interface (e.g., the network interface 214) of the personal computing device.

At 606, the technique 600 includes testing communications network conditions for one or more network socket pair connections. The technique 600 may include testing communications network conditions for a network socket pair connection between the personal computing device and the media server that bypasses the virtual desktop infrastructure server to obtain direct connection test results. For example, the network socket pair may include sockets of a transport layer protocol (e.g., UDP, Transmission Control Protocol (TCP), Stream Control Transmission Protocol (SCTP), or Datagram Congestion Control Protocol (DCCP)). For example, the network socket pair may include a socket at the media server and a socket at the personal computing device that may be used to send media data between the two devices using the applicable communications network protocol. In some implementations, a socket pair is selected from designated ranges of UDP ports for the two devices being connected. For example, testing communications network conditions for the network socket pair connection between the personal computing device and the media server that bypasses the virtual desktop infrastructure server may include performing a handshake test using the network socket pair connection. For example, a handshake test may include an exchange of RTP Control Protocol (RTCP) packets back and forth between the personal computing device and the media server. In some implementations, the direct connection test results include a network latency metric. In some implementations, the direct connection test results include a network data throughput metric. At 606, the technique 600 may also include testing communications network conditions for a second network socket pair connection between the personal computing device and the virtual desktop infrastructure server to obtain indirect connection test results. For example, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric. For example, at 606, testing communications network conditions for one or more network socket pair connections may include implementing the technique 700 of FIG. 7. For example, at 606, testing communications network conditions for one or more network socket pair connections may include implementing the technique 800 of FIG. 8.

At 608, the technique 600 includes, based on the direct connection test results, selecting a media channel from among a set of media channels for a call initiated using the virtual desktop infrastructure server. The set of media channels includes a first media channel (e.g., the first media channel 550) using the network socket pair connection between the personal computing device and the media server and a second media channel (e.g., the second media channel 552) that is routed through the virtual desktop infrastructure server and encapsulated in a protocol (e.g., the ICA protocol or the RDP protocol) for exchanging data for virtual desktop applications. In some implementations, the set of media channels also includes a media channel (e.g., the third media channel 554) using the second network socket pair connection between the personal computing device and the virtual desktop infrastructure server. Selecting the media channel may also be based on the indirect connection test results. For example, if the direct connection test results satisfy a criterion (e.g., a connection is established with acceptable throughput and/or latency), then the first media channel may be selected for use in the call. For example, if the direct connection test results fail to satisfy a criterion and the indirect connection test results satisfy a criterion (e.g., a connection is established with acceptable throughput and/or latency), then the third media channel may be selected for use in the call. For example, if both the direct connection test results and the indirect connection test results fail to satisfy a criterion, then the second media channel may be selected for use in the call. In some implementations, the direct connection test results are compared to the indirect connection test results and media channel with the better connection test results is selected for use in the call. In some implementations, the set of media channels includes more media channels (e.g., direct and/or indirect media channels using different protocols for transport across a communications network) for which connection test results are determined and a media channel is selected based on these additional connection test results.

At 610, the technique 600 includes transferring media data between the media server and the personal computing device using the selected media channel to enable the call. For example, the media data transferred using the selected media channel includes packets of audio data. In some implementations, the media data transferred using the selected media channel includes packets of video data. When the selected media channel is the second media channel that is routed through the virtual desktop infrastructure server and encapsulated in the protocol (e.g., ICA or RDP) for exchanging data for virtual desktop applications, the technique 600 may include merging multiple streams of media data in a single virtual channel of the protocol. For example, audio streams for multiple participants in the call may be merged in a single ICA virtual channel. In some implementations, data for the call, including the media data and call control data, is transferred in a single virtual channel of the protocol (e.g., ICA or RDP). For example, a single virtual channel may be used to transfer all data for the call. Merging call data of different types (e.g., media data, control data, share data) and/or from different sources (e.g., different call participants) may provide one or more benefits, such as conserving the number virtual channels used for the call and enabling custom prioritization of call data within the call to enhance call quality. Using a media channel selected based on dynamic communications network conditions may enable a system for supporting calls with virtual desktop infrastructure to more efficiently scale while preserving or enhancing call quality.

Referring to FIG. 7, the technique 700 for testing communications network conditions for network socket pair connections in system configured to enable calls using a virtual desktop instance is shown. At 702, the technique 700 includes testing communications network conditions for a network socket pair connection between a personal computing device (e.g., the personal computing device 530) and a media server (e.g., the media server 510) that bypasses a virtual desktop infrastructure server (e.g., the virtual desktop infrastructure server 520) to obtain direct connection test results. For example, testing communications network conditions for the network socket pair connection between the personal computing device and the media server that bypasses the virtual desktop infrastructure server may include performing a handshake test using the network socket pair connection. For example, a handshake test may include an exchange of RTCP packets back and forth between the personal computing device and the media server. In some implementations, the direct connection test results include a network latency metric. In some implementations, the direct connection test results include a network data throughput metric.

At 704, if the direct connection test results satisfy a criterion, then the technique 700 includes, at 706, continuing to selection of the media channel. For example, using the first media channel 550 may be preferred, so it may be sufficient to check the direct connection test results and select, at 608, the first media channel based on the direct connection test results.

At 704, if the direct connection test results do not satisfy a criterion, then the technique 700 includes, at 708, testing communications network conditions for a second network socket pair connection between the personal computing device and the virtual desktop infrastructure server to obtain indirect connection test results. For example, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric.

At 710, the technique 700 includes continuing to selection of the media channel. For example, where the direct connection test results fail to satisfy the criterion, the indirect connection test results are also determined and checked to prepare for selecting, at 608, a media channel based on the direct connection test results and also based on the indirect connection test results. For example, the indirect connection test results may be considered to select between the second media channel 552 and the third media channel 544 after the first media channel 550 has been ruled out based on the direct connection test results.

Referring to FIG. 8, the technique 800 for testing communications network conditions for network socket pair connections in system configured to enable calls using a virtual desktop instance is shown. At 802, the technique 800 includes testing communications network conditions for a network socket pair connection between a personal computing device (e.g., the personal computing device 530) and a media server (e.g., the media server 510) that bypasses a virtual desktop infrastructure server (e.g., the virtual desktop infrastructure server 520) to obtain direct connection test results. For example, testing communications network conditions for the network socket pair connection between the personal computing device and the media server that bypasses the virtual desktop infrastructure server may include performing a handshake test using the network socket pair connection. For example, a handshake test may include an exchange of RTCP packets back and forth between the personal computing device and the media server. In some implementations, the direct connection test results include a network latency metric. In some implementations, the direct connection test results include a network data throughput metric.

At 804, the technique 800 includes testing communications network conditions for a second network socket pair connection between the personal computing device and the virtual desktop infrastructure server to obtain indirect connection test results. For example, testing communications network conditions for the second network socket pair connection between the personal computing device and the virtual desktop infrastructure server may include performing a handshake test using the second network socket pair connection. In some implementations, the indirect connection test results include a network latency metric. In some implementations, the indirect connection test results include a network data throughput metric.

At 806, the technique 800 includes comparing the direct connection test results to the indirection connection test results. For example, throughputs and/or latencies measured for the respective network socket pair connections may be compared. In some implementations, the comparison may be handicapped to favor a preferred media channel (e.g., the direct connection tests results may be enhanced for comparison where the first media channel 550 is preferred for system utilization purposes.

At 808, the technique 800 includes continuing to selection, at 608, of the media channel. For example, at 608, the media channel may be selected based on the comparison of the direct connection test results to the indirection connection test results.

Referring to FIG. 9, the technique 900 for selecting a media channel to support a call initiated using a virtual desktop infrastructure server is shown. The technique 600 incorporates the use of timers as part of a scheme to test communications network conditions and select a media mode for a call. At 902, the technique 900 includes performing a VDI plugin detection operation. At 904, if a VDI plugin was not successfully detected, then the technique 900 includes, at 906, selecting the use of a fallback mode for media streaming for the call. For example, a fallback mode may include running media codecs for the call on the VDI server, which in turn transfers media data to and/or from a personal computing device that is the user interface to the call at a full uncompressed data rate via a standard channel of a VDI protocol being used. At 904, if a VDI plugin was successfully detected, then the technique 900 includes, at 908, starting a media mode detection operation. For example, step 908 may be a starting point for testing to detect the media mode to be used for a call. At 910, a 15 second timer is started. If a complete test result is not achieved within 15 seconds, then the technique 900 includes, at 906, selecting the use of the fallback mode for media streaming for the call. While the 15 second timer is still running, the technique 900 includes, at 912 trying to detect the status of a media channel that uses a UDP socket pair connection between the VDI server and the personal computing device. For example, the techniques described in relation to step 708 in FIG. 7 may be used to test media channel that uses a UDP socket pair connection between the VDI server and the personal computing device. When the UDP socket pair connection between the VDI server and the personal computing device is tested, a 1 second timer is started and, at 914, a detection result for the media channel that uses a UDP socket pair connection between the VDI server and the personal computing device is set or stored for later use. One second later, at 916, the technique includes trying to detect the status of a direct mode media channel, which uses a more direct connection between the personal computing device and a media server supporting the call. The direct mode media channel may bypass the VDI server. For example, the direct mode media channel may use a UDP socket pair connection between the media server and the personal computing device. For example, the techniques described in relation to step 702 in FIG. 7 may be used to test the direct mode media channel.

At 918, if the direct mode detection test succeeded, then the technique 900 includes, at 920 selecting the use of the direct mode for media streaming for the call. For example, the direct mode may use a UDP socket pair connection between the media server and the personal computing device to transfer media data for the call. At 918, the technique 900 includes setting a 1 second timer and waiting up to 1 second to get a result. Otherwise, if the timer expires, the detection result is failure, the technique 900 proceeds to check the next option.

At 922, if the UDP mode detection test succeeded, then the technique 900 includes, at 924 selecting the use of the UDP mode for media streaming for the call. For example, the UDP mode may use a UDP socket pair connection between the VDI server and the personal computing device to transfer media data for the call.

At 922, if the UDP mode detection test failed, then the technique 900 includes, at 926 selecting the use of an ICA mode for media streaming for the call. For example, the ICA mode may use a virtual channel of the ICA protocol between the VDI server and the personal computing device to transfer media data for the call. The media data transferred using ICA mode, like UDP mode, and Direct mode, may be compressed to conserve network bandwidth resources. A plugin running on the personal computing device may use one or more media codecs to process media data locally, instead of relying on an application running on VDI server to perform these functions.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    testing, based on a request for a call, conditions for a first network socket pair connection between a personal computing device and a media server bypassing a virtual desktop infrastructure server to obtain direct connection test results;
    testing, based on the request for the call, conditions for a second network socket pair connection between the personal computing device and the virtual desktop infrastructure server to obtain indirect connection test results; and
    transferring, using a media channel available to the personal computing device and selected based on the direct connection test results and the indirect connection test results, media data to enable the call.

2. The method of claim 1, comprising:
    selecting the media channel from a set of media channels including a first media channel that uses the first network socket pair connection, a second media channel that is routed through the virtual desktop infrastructure server, and a third media channel that uses the second network socket pair connection.

3. The method of claim 1, comprising:
    comparing the direct connection test results and the indirect connection test results to select the media channel.

4. The method of claim 1, wherein transferring the media data to enable the call comprises:
    transferring the media data between the media server and the personal computing device using the media channel.

5. The method of claim 1, comprising:
merging multiple streams of the media data in a single virtual channel of a protocol for exchanging data for virtual desktop applications.

6. The method of claim 1, comprising:
transferring data, including the media data and call control data, for the call in a single virtual channel of a protocol for exchanging data for virtual desktop applications.

7. The method of claim 1, wherein the request for the call is transmitted to the virtual desktop infrastructure server using the personal computing device.

8. The method of claim 1, wherein the media server is identified using call parameters received from the virtual desktop infrastructure server.

9. A non-transitory computer readable medium storing instructions operable to cause one or more processors to perform operations comprising:
testing, based on a request for a call, conditions for a first network socket pair connection between a personal computing device and a media server bypassing a virtual desktop infrastructure server to obtain direct connection test results;
testing, based on the request for the call, conditions for a second network socket pair connection between the personal computing device and the virtual desktop infrastructure server to obtain indirect connection test results; and
transferring, using a media channel available to the personal computing device and selected based on the direct connection test results and the indirect connection test results, media data to enable the call.

10. The non-transitory computer readable medium of claim 9, wherein the media channel uses one of the first network socket pair connection or the second network socket pair connection.

11. The non-transitory computer readable medium of claim 9, wherein the media channel is routed through the virtual desktop infrastructure server and encapsulated in a protocol for exchanging data for virtual desktop applications.

12. The non-transitory computer readable medium of claim 9, the operations comprising:
selecting the media channel based on a comparison of the direct connection test results and the indirect connection test results.

13. The non-transitory computer readable medium of claim 9, the operations comprising:
identifying the media server using call parameters received from the virtual desktop infrastructure server.

14. An apparatus, comprising:
a memory; and
a processor configured to execute instructions stored in the memory to:
test, based on a request for a call, conditions for a first network socket pair connection between a personal computing device and a media server bypassing a virtual desktop infrastructure server to obtain direct connection test results;
test, based on the request for the call, conditions for a second network socket pair connection between the personal computing device and the virtual desktop infrastructure server to obtain indirect connection test results; and
transfer, using a media channel available to the personal computing device and selected based on the direct connection test results and the indirect connection test results, media data to enable the call.

15. The apparatus of claim 14, wherein the media channel is one of a first media channel that uses the first network socket pair connection, a second media channel that is routed through the virtual desktop infrastructure server, or a third media channel that uses the second network socket pair connection.

16. The apparatus of claim 14, wherein the media channel is selected based on one or both of the first network socket pair connection or the second network socket pair connection.

17. The apparatus of claim 14, wherein the request for the call is transmitted to the virtual desktop infrastructure server using the personal computing device and call parameters used to identify the media server are received from the virtual desktop infrastructure server using the personal computing device.

18. The apparatus of claim 14, wherein multiple streams of the media data are merged into a single virtual channel of a protocol for exchanging data for virtual desktop applications.

19. The apparatus of claim 14, wherein the media data and call control data are transferred in a single virtual channel of a protocol for exchanging data for virtual desktop applications.

20. The apparatus of claim 14, wherein the media server is a public branch exchange server.

* * * * *